(12) United States Patent
McGuinn et al.

(10) Patent No.: US 6,450,037 B1
(45) Date of Patent: Sep. 17, 2002

(54) NON-INTRUSIVE FIBER OPTIC PRESSURE SENSOR FOR MEASURING UNSTEADY PRESSURES WITHIN A PIPE

(75) Inventors: Rebecca S. McGuinn, Middletown; Daniel L. Gysling, Glastonbury; Charles R. Winston, Glastonbury; Allen R. Davis, Glastonbury; John M. Faustino, Hamden, all of CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/344,093

(22) Filed: Jun. 25, 1999

Related U.S. Application Data

(63) Continuation-in-part of application No. 09/105,525, filed on Jun. 26, 1998, now abandoned.

(51) Int. Cl.[7] .............................. G01L 9/00; G01J 1/56; G01J 5/46; G01J 4/00; G01J 5/08
(52) U.S. Cl. ................. 73/705; 250/227.19; 250/231.19
(58) Field of Search ......................... 73/705, 800, 730; 250/227.16, 231.19, 227.19, 227.21, 227.27, 227.14; 356/357, 358, 35.5, 346, 73.1

(56) References Cited

U.S. PATENT DOCUMENTS

| | | | |
|---|---|---|---|
| 3,149,492 A | 9/1964 | Weinberg | 73/393 |
| 4,482,248 A * | 11/1984 | Papuchon et al. | 356/346 |
| 4,515,473 A | 5/1985 | Mermelstein | 356/33 |
| 4,706,501 A | 11/1987 | Atkinson et al. | 73/730 |
| 4,976,151 A | 12/1990 | Morishita | 73/730 |
| 5,024,099 A | 6/1991 | Lee | 73/730 |
| 5,031,460 A | 7/1991 | Kanenobu et al. | 73/730 |
| 5,040,415 A | 8/1991 | Barkhoudarian | 73/198 |
| 5,083,452 A | 1/1992 | Hope | 73/61 R |
| 5,218,197 A * | 6/1993 | Carroll | 250/227.19 |
| 5,363,342 A | 11/1994 | Layton et al. | 367/149 |
| 5,398,542 A | 3/1995 | Vasbinder | 73/40.5 |
| 5,440,932 A | 8/1995 | Wareham | 73/730 |
| 5,591,922 A | 1/1997 | Segeral et al. | 73/861.04 |
| 5,670,720 A | 9/1997 | Clark et al. | 73/730 |
| 5,741,980 A | 4/1998 | Hill et al. | 73/861.04 |
| 5,845,033 A | 12/1998 | Berthold et al. | 385/12 |
| 5,986,749 A * | 11/1999 | Wu et al. | 356/73.1 |

OTHER PUBLICATIONS

"Noise and Vibration Control Engineering Principles and Applications", Leo L. Beranek and Istvan L. Ver, A Wiley Interscience Publication, pp. 537–541, No date.

* cited by examiner

*Primary Examiner*—William Oen

(57) ABSTRACT

Non-intrusive pressure sensors 14–18 for measuring unsteady pressures within a pipe 12 include an optical fiber 10 wrapped in coils 20–24 around the circumference of the pipe 12. The length or change in length of the coils 20–24 is indicative of the unsteady pressure in the pipe. Bragg gratings 310–324 impressed in the fiber 10 may be used having reflection wavelengths $\lambda$ that relate to the unsteady pressure in the pipe. One or more of sensors 14–18 may be axially distributed along the fiber 10 using wavelength division multiplexing and/or time division multiplexing.

6 Claims, 2 Drawing Sheets

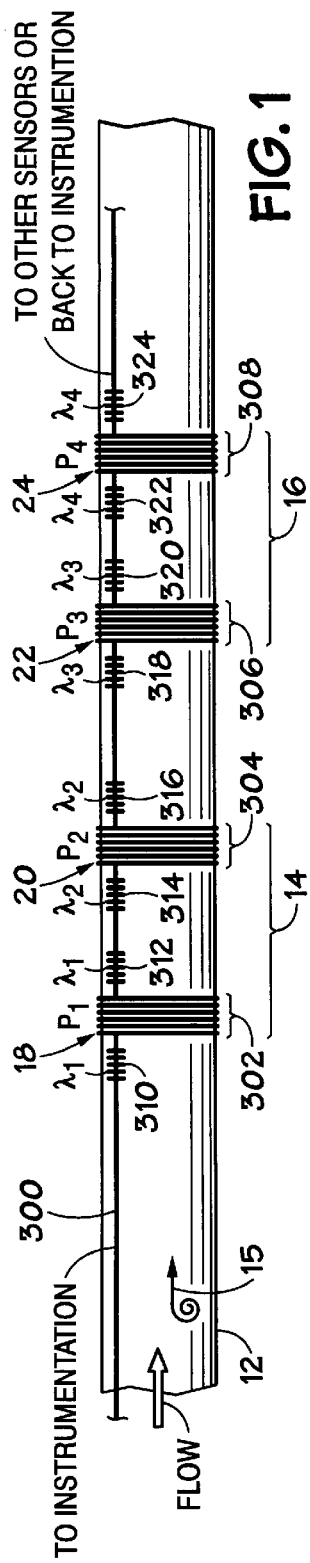
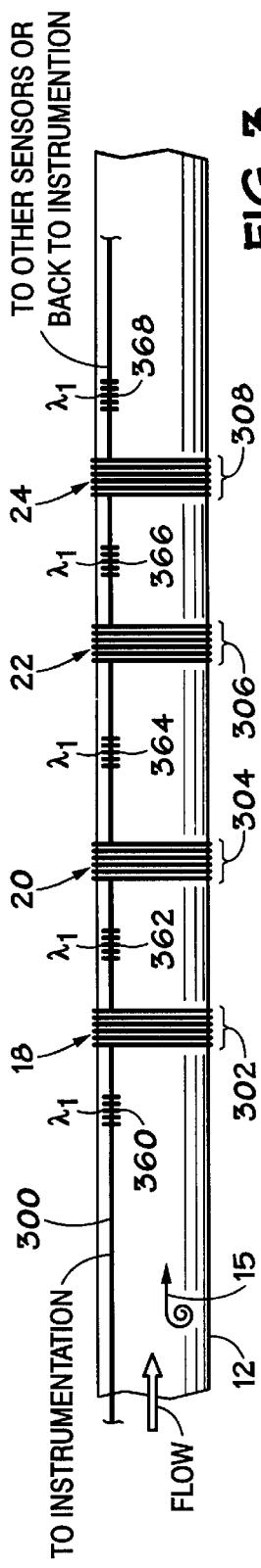
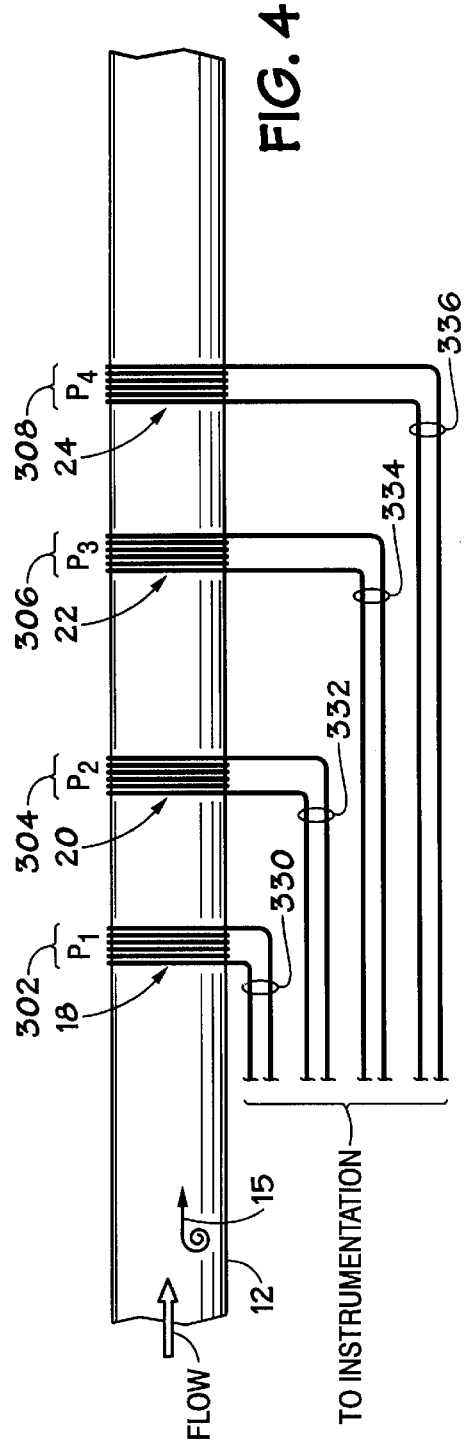

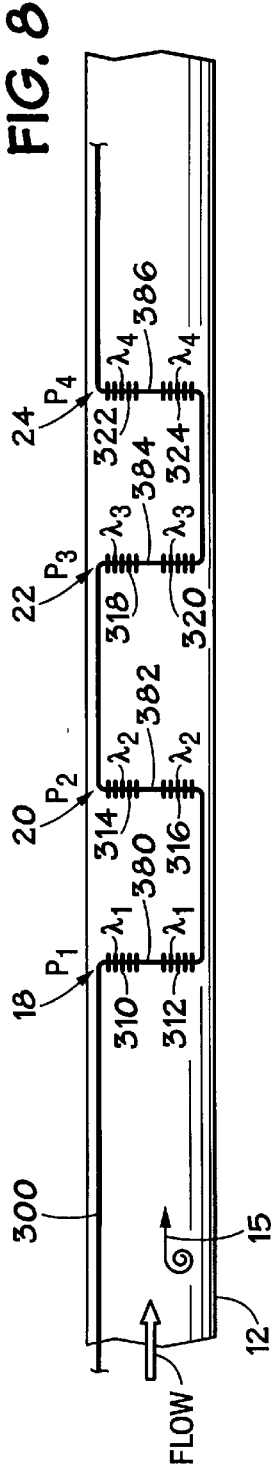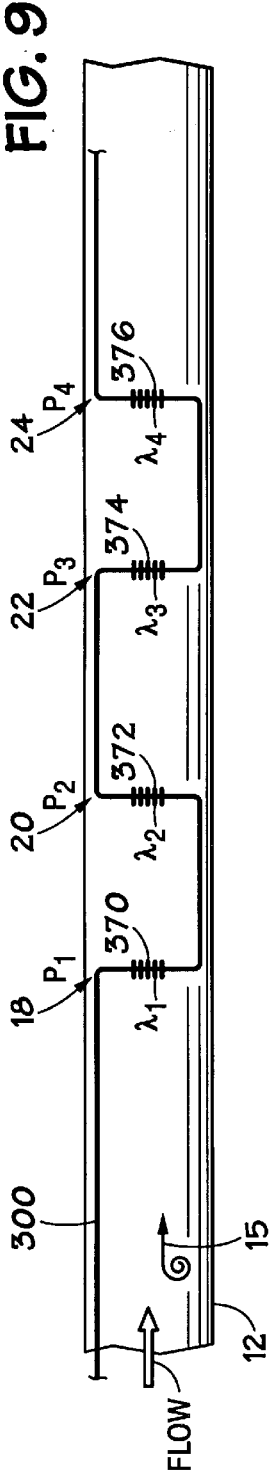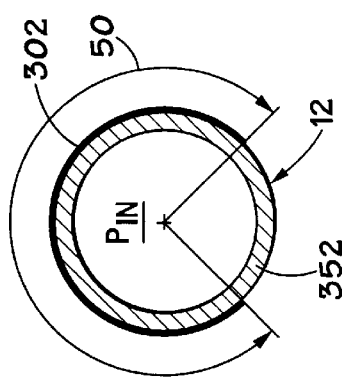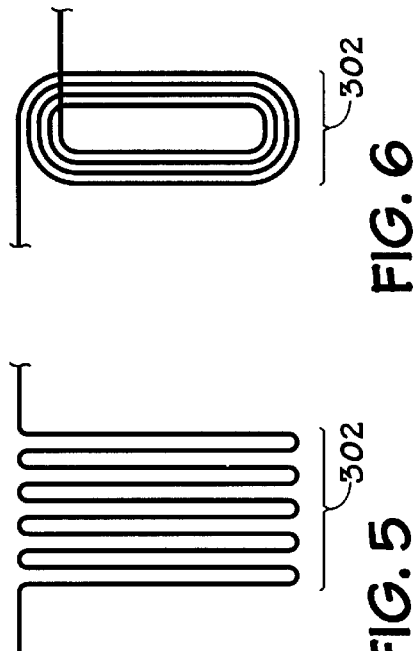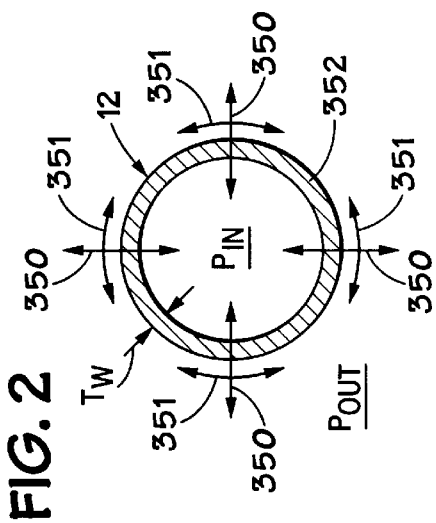

US 6,450,037 B1

NON-INTRUSIVE FIBER OPTIC PRESSURE SENSOR FOR MEASURING UNSTEADY PRESSURES WITHIN A PIPE

CROSS REFERENCES TO RELATED APPLICATIONS

This application is a continuation-in-part of commonly owned U.S. Patent Application, Ser. No., 09/105,525, entitled "Non-Intrusive Fiber Optic Pressure Sensor for Measuring Pressure Inside, Outside and Across Pipes",filed Jun. 26, 1998 now abandoned.

TECHNICAL FIELD

This invention relates to sensing pressure around pipes and more particularly to a non-intrusive fiber pressure sensor for measuring unsteady pressures within a pipe.

BACKGROUND ART

It is known in the oil and gas industry that the measurement of fluid pressure in a down-hole pipe is useful to exploration and production of oil and gas. However, typical pressure sensors require that a hole be drilled in the pipe to port the pressure to the sensor, or that the sensor or portion thereof be deployed in the pipe. Drilling holes in the pipes can be costly and add failure modes to the system. Accordingly, it would be desirable to measure pressure in a pipe in a non-invasive manner.

SUMMARY OF THE INVENTION

Objects of the present invention include provision of a non-intrusive pressure sensor for measuring unsteady pressure within pipes.

According to the present invention, a pressure sensor for measuring unsteady (ac, dynamic or time varying) pressure at least one axial location along a pipe, comprises an optical fiber wrapped around the circumference of the pipe.

According still further to the present invention, a length of said optical fiber changes when the pressure to be measured changes. According still further to the present invention, a reflective element is disposed within said fiber having a reflection wavelength related the pressure.

The present invention provides a significant improvement over the prior art by providing a non-intrusive pressure sensor for the measurement of unsteady pressure in a pipe using fiber optic sensing. Also, the present invention eliminates the need for any electronic components down-hole, thereby improving reliability of the measurement. Still further, the present invention is inherently safe and explosion proof as compared to electrical systems. The present invention may also provide circumferentially averaged pressure and/or axially averaged unsteady pressure over a predetermined axial length of the pipe. Circumferential averaging naturally filters out pressure disturbances such as those associated with transverse pipe vibrations, flow noise, and higher dimensional acoustic oscillations. This attribute is useful for measuring propagating one-dimensional acoustic waves. Thus, the present invention enables real time unsteady pressure measurement for oil and gas exploration and production or for other applications where a fluid (liquid or gas) is flowing in a pipe or conduit.

The foregoing and other objects, features and advantages of the present invention will become more apparent in light of the following detailed description of exemplary embodiments thereof.

BRIEF DESCRIPTION OF THE DRAWINGS

FIG. 1 is a side view of a pipe having optical fiber wrapped around the pipe at each unsteady pressure measurement location and a pair of Bragg gratings around each optical wrap, in accordance with the present invention.

FIG. 2 is a cross-sectional end view a pipe showing inside pressure Pin and outside pressures Pout, in accordance with the present invention.

FIG. 3 is a side view of a pipe having optical fiber wrapped around the pipe at each unsteady pressure measurement location with a single Bragg grating between each pair of optical wraps, in accordance with the present invention.

FIG. 4 is a side view of a pipe having optical fiber wrapped around the pipe at each unsteady pressure measurement location without Bragg gratings around each of the wraps, in accordance with the present invention.

FIG. 5 is an alternative geometry of an optical wrap of FIGS. 1,3 of a radiator tube geometry, in accordance with the present invention.

FIG. 6 is an alternative geometry of an optical wrap of FIGS. 1,3 of a race track geometry, in accordance with the present invention.

FIG. 7 is a cross-sectional end view a pipe wrapped with an optical fiber of FIGS. 5,6, in accordance with the present invention.

FIG. 8 is a side view of a pipe having a pair of gratings at each axial sensing location, in accordance with the present invention.

FIG. 9 is a side view of a pipe having a single grating at each axial sensing location, in accordance with the present invention.

BEST MODE FOR CARRYING OUT THE INVENTION

Referring to FIG. 1, a pipe (or conduit) 12 is provided with a plurality of nonintrusive distributed fiber grating based pressure sensors 18–24 located along the pipe 12. Each of the pressure sensors 18–24 comprises corresponding coils 302–308 having a predetermined length wrapped around the pipe 12. Each of the sensors 14–18 comprises one or more Bragg gratings 310–324 having predetermined reflection wavelengths $\lambda_1, \lambda_2, \lambda_3, \lambda_4$ associated therewith.

The gratings 310–324 are similar to that described in U.S. Pat. No. 4,725,110, entitled "Method for Impressing Gratings Within Fiber Optics",to Glenn et al; however, any wavelength tunable grating or reflective element embedded in the fiber 10 may be used if desired. A Bragg grating, as is known, reflects a predetermined wavelength band of light having a central peak reflection wavelength $\lambda b$, and passes the remaining wavelengths of the incident light (within a predetermined wavelength range). Accordingly, input light 40 propagates along the fiber 10 to the sensors 14–18 and the gratings 310–324 reflect light 42 back along the fiber 10.

Still referring to FIG. 1, optical pressure sensors 18–24 may be Bragg grating based pressure sensors, such as that described in copending U.S. Patent Application, Ser. No. 08/925,598, entitled "High Sensitivity Fiber Optic Pressure Sensor For Use In Harsh Environments", filed Sep. 8, 1997. Alternatively, the sensors 18–24 may be optical strain gages attached to or embedded in the outer or inner wall of the pipe which measure pipe wall strain. In an embodiment of the present invention, the fiber optic pressure sensors 18–24, may be connected individually or may be multiplexed along one or more optical fibers using wavelength division multiplexing (WDM), time division multiplexing (TDM), or any other optical multiplexing techniques (discussed more hereinafter).

Referring to FIG. 2, fiber optic pressure sensors 18–24 (FIGS. 1,3,4,7,8,9), it may measure the unsteady (or dynamic or ac) pressure variations Pin inside the pipe 12 by measuring the elastic expansion and contraction, as represented by arrows 350, of the diameter (and thus the circumference as represented by arrows 351) of the pipe 12. In general, the strain gages would measure the pipe wall deflection in any direction in response to unsteady pressure inside the pipe 12. The elastic expansion and contraction of pipe 12 is measured at the location of the strain gage as the internal pressure $P_{in}$ changes, and thus measures the local strain (axial strain, hoop strain or off axis strain), caused by deflections in the directions indicated by arrows 351, on the pipe 12. The amount of change in the circumference is variously determined by the hoop strength of the pipe 12, the internal pressure $P_{in}$, the external pressure $P_{out}$ outside the pipe 12, the thickness $T_W$, of the pipe wall 352, and the rigidity or modulus of the pipe material. Thus, the thickness of the pipe wall 352 and the pipe material in the sensor sections 14,16 (FIG. 1) may be set based on the desired sensitivity of the sensors and other factors and may be different from the wall thickness or material of the pipe 12 outside the sensing regions 14,16.

Referring to FIGS. 1,3,4, alternative arrangements of optical strain gage pressure sensors are shown. The fiber optic pressure sensors 18–24 may be configured using an optical fiber 300 that is coiled or wrapped around and attached to the pipe 12 at each of the pressure sensor locations as indicated by the coils or wraps 302–308 for the pressures $P_1,P_2,P_3,P_4$, respectively. The fiber wraps 302–308 are wrapped around the pipe 12 such that the length of each of the fiber wraps 302–308 changes with changes in the pipe hoop strain in response to unsteady pressure variations within the pipe 12 and thus internal pipe pressure is measured at the respective axial location. Such fiber length changes are measured using known optical measurement techniques as discussed hereinafter. Each of the wraps measure substantially the circumferentially averaged pressure within the pipe 12 at a corresponding axial location on the pipe 12. Also, the wraps provide axially averaged pressure over the axial length of a given wrap. While the structure of the pipe 12 provides some spatial filtering of short wavelength disturbances, we have found that the basic principle of operation of the invention remains substantially the same as that for the point sensors described hereinbefore.

Referring to FIG. 1, for embodiments of the present invention where the wraps 302–308 are connected in series, pairs of Bragg gratings (310,312),(314,316), (318,320), (322,324) may be located along the fiber 300 at opposite ends of each of the wraps 302,304,306,308, respectively. The grating pairs are used to multiplex the pressure signals $P_1,P_2,P_3,P_4$ to identify the individual wraps from optical return signals. The first pair of gratings 310,312 around the wrap 302 may have a common reflection wavelength $\lambda_1$, and the second pair of gratings 314,316 around the wrap 304 may have a common reflection wavelength $\lambda_2$, but different from that of the first pair of gratings 310,312. Similarly, the third pair of gratings 318,320 around the wrap 306 have a common reflection wavelength $\lambda_3$, which is different from $\lambda_1,\lambda_2$, and the fourth pair of gratings 322,324 around the wrap 308 have a common reflection wavelength $\lambda_4$, which is different from $\lambda_1,\lambda_2,\lambda_3$.

Referring to FIG. 2, instead of having a different pair of reflection wavelengths associated with each wrap, a series of Bragg gratings 360–368 with only one grating between each of the wraps 302–308 may be used each having a common reflection wavlength $\lambda_1$.

Referring to FIGS. 1 and 3 the wraps 302–308 with the gratings 310–324 (FIG.1) or with the gratings 360–368 (FIG. 3) may be configured in numerous known ways to precisely measure the fiber length or change in fiber length, such as an interferometric, Fabry Perot, time-of-flight, or other known arrangements. An example of a Fabry Perot technique is described in U.S. Pat. No. 4,950,883 "Fiber Optic Sensor Arrangement Having Reflective Gratings Responsive to Particular Wavelengths",to Glenn. One example of time-of-flight (or Time-Division-Multiplexing; TDM) would be where an optical pulse having a wavelength is launched down the fiber 300 and a series of optical pulses are reflected back along the fiber 300. The length of each wrap can then be determined by the time delay between each return pulse.

Alternatively, a portion or all of the fiber between the gratings (or including the gratings, or the entire fiber, if desired) may be doped with a rare earth dopant (such as erbium) to create a tunable fiber laser, such as is described in U.S. Pat. No. 5,317,576, "Continuously Tunable Single Mode Rare-Earth Doped Laser Arrangement",to Ball et al or U.S. Pat. No. 5,513,913, "Active Multipoint Fiber Laser Sensor",to Ball et al, or U.S. Pat. No. 5,564,832, "Birefringent Active Fiber Laser Sensor",to Ball et al, which are incorporated herein by reference.

While the gratings 310–324 are shown oriented axially with respect to pipe 12, in FIGS. 1,3, they may be oriented along the pipe 12 axially, circumferentially, or in any other orientations. Depending on the orientation, the grating may measure deformations in the pipe wall 352 with varying levels of sensitivity. If the grating reflection wavelength varies with internal pressure changes, such variation may be desired for certain configurations (e.g., fiber lasers) or may be compensated for in the optical instrumentation for other configurations, e.g., by allowing for a predetermined range in reflection wavelength shift for each pair of gratings. Alternatively, instead of each of the wraps being connected in series, they may be connected in parallel, e.g., by using optical couplers (not shown) prior to each of the wraps, each coupled to the common fiber 300.

Referring to FIG. 4, alternatively, the sensors 18–24 may also be formed as a purely interferometric sensor by wrapping the pipe 12 with the wraps 302–308 without using Bragg gratings where separate fibers 330,332,334,336 may be fed to the separate wraps 302,304,306,308, respectively. In this particular embodiment, known interferometric techniques may be used to determine the length or change in length of the fiber 10 around the pipe 12 due to pressure changes, such as Mach Zehnder or Michaelson Interferometric techniques, such as that described in U.S. Pat. No. 5,218,197, entitled "Method and Apparatus for the Noninvasive Measurement of Pressure Inside Pipes Using a Fiber Optic Interferometer Sensor" to Carroll. The interferometric wraps may be multiplexed such as is described in Dandridge, et al, "Fiber Optic Sensors for Navy Applications", IEEE, Feb. 1991, or Dandridge, et al, "Multiplexed Interferometric Fiber Sensor Arrays",SPIE, Vol. 1586, 1991, pp176–183. Other techniques to determine the change in fiber length may be used. Also, reference optical coils (not shown) may be used for certain interferometric approaches and may also be located on or around the pipe 12 but may be designed to be insensitive to pressure variations.

Referring to FIGS. 5 and 6, instead of the wraps 302–308 being optical fiber coils wrapped completely around the pipe 12, the wraps 302–308 may have alternative geometries, such as a "radiator coil" geometry (FIG. 5) or a "race-track" geometry (FIG. 6), which are shown in a side view as if the pipe 12 is cut axially and laid flat. In this particular embodiment, the fiber optic pressure sensor 302 may not necessarily be wrapped 360 degrees around the pipe as best shown with reference to FIG. 7, but may be disposed over a predetermined portion of the circumference of the pipe 12 represented by arrow 50. The fiber optic pressure sensor 302 will have a length long enough to optically detect the changes to the pipe circumference. Other geometries for the wraps and fiber optic sensor configurations may be used if desired. Also, for any geometry of the wraps described herein, more than one layer of fiber may be used depending on the overall fiber length desired. The desired axial length of any particular wrap is set depending on the characteristics of the ac pressure desired to be measured, for example the axial or coherence length of a pressure disturbance caused by a vortex to be measured.

Referring to FIGS. 8 and 9, embodiments of the present invention include configurations wherein instead of using the wraps 302–308, the fiber 300 may have shorter sections that are disposed around at least a portion of the circumference of the pipe 12 that can optically detect changes to the pipe circumference. It is further within the scope of the present invention that sensors may comprise an optical fiber 300 disposed in a helical pattern (not shown) about pipe 12. As discussed herein above, the orientation of the strain sensing element will vary the sensitivity to deflections in pipe wall 352 caused by unsteady pressure transients in the pipe 12.

Referring to FIG. 8, in particular, the pairs of Bragg gratings (310,312), (314,316), (318,320), (322,324) are located along the fiber 300 with sections 380–386 of the fiber 300 between each of the grating pairs, respectively. In that case, known Fabry Perot, interferometric, time-of-flight or fiber laser sensing techniques may be used to measure the strain in the pipe, in a manner similar to that described in the aforementioned references.

Referring to FIG. 9, alternatively, individual gratings 370–376 may be disposed on the pipe and used to sense the unsteady variations in strain in the pipe 12 (and thus the unsteady pressure within the pipe) at the sensing locations. When a single grating is used per sensor, the grating reflection wavelength shift will be indicative of changes in pipe diameter and thus pressure.

Any other techniques or configurations for an optical strain gage may be used. The type of optical strain gage technique and optical signal analysis approach is not critical to the present invention, and the scope of the invention is not intended to be limited to any particular technique or approach.

For any of the embodiments described herein, the pressure sensors may be attached to the pipe by adhesive, glue, epoxy, tape or other suitable attachment means to ensure suitable contact between the sensor and the pipe 12. The sensors may alternatively be removable or permanently attached via known mechanical techniques such as mechanical fastener, spring loaded, clamped, clam shell arrangement, strapping or other equivalents. Alternatively, the optical fibers and/or gratings, may be embedded in a composite pipe. If desired, for certain applications, the gratings may be detached from (or strain or acoustically isolated from) the pipe 12 if desired.

The present invention may be used to measure any parameter (or characteristic) of the contents of the pipe which is related to unsteady (ac, dynamic or time varying) pressure. For example, the present invention may be used to measure when a slug of liquid or solid passes through the pipe by the sensor due to the dynamic pressure wave which is created.

Also, instead of a pipe, any conduit for carrying a fluid (where a fluid is defined as a liquid or a gas) may be used if desired. Further, it should be understood that the present invention may be used in optical reflection and/or transmission. Also, even though the invention has been illustrated using four pressure sensors, it should be understood that more or less sensors may be used, depending on the application.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring a pressure disturbance in a pipe, comprising:

a first optical fiber section placed circumferentially around a portion of the circumference of the pipe at a first axial location;

a second optical fiber section in communication with the first optical fiber section and placed parallel to an axis of the pipe;

a third optical fiber section in communication with the second optical fiber section and placed circumferentially around a portion of the circumference of the pipe at a second axial location.

2. The apparatus of claim 1, wherein the first optical fiber section comprises a first fiber Bragg grating and the third optical fiber section comprises a second fiber Bragg grating.

3. The apparatus of claim 2, wherein the first and second fiber Bragg gratings reflect light of different wavelengths.

4. The apparatus of claim 1, wherein the first optical fiber section comprises a first pair of fiber Bragg gratings and the third optical fiber section comprises a second pair of fiber Bragg gratings.

5. The apparatus of claim 4, wherein the first pair of fiber Bragg gratings reflect light of a first wavelength, and the second pair of fiber Bragg gratings reflect light of a second wavelength different from the first wavelength.

6. The apparatus of claim 1, wherein the optical fiber measures an axial average unsteady pressure along a predetermined axial length of the pipe.

* * * * *